(12) United States Patent
Gharda et al.

(10) Patent No.: US 6,560,702 B1
(45) Date of Patent: May 6, 2003

(54) METHOD AND APPARATUS FOR EXECUTION OF AN APPLICATION DURING COMPUTER PRE-BOOT OPERATION

(75) Inventors: Laurent K. Gharda, Menlo Park, CA (US); Jeff Chen, Taipei (TW)

(73) Assignee: Phoenix Technologies Ltd., San Jose, CA (US)

( * ) Notice: Subject to any disclaimer, the term of this patent is extended or adjusted under 35 U.S.C. 154(b) by 0 days.

(21) Appl. No.: 09/336,181

(22) Filed: Jun. 18, 1999

Related U.S. Application Data

(63) Continuation-in-part of application No. 08/988,603, filed on Dec. 10, 1997, now Pat. No. 6,009,520.

(51) Int. Cl.$^7$ .............................................. G06F 9/445
(52) U.S. Cl. ........................ 713/2; 713/100; 710/104; 709/221
(58) Field of Search ................................ 713/1, 2, 100; 709/220, 221, 222; 710/8, 10, 104; 717/11; 711/170, 173

(56) References Cited

U.S. PATENT DOCUMENTS

| | | | |
|---|---|---|---|
| 4,896,289 A | * 1/1990 | Svinicki et al. ............. 464/900 |
| 5,072,368 A | 12/1991 | Foreman et al. |
| 5,128,995 A | 7/1992 | Arnold et al. |
| 5,321,827 A | 6/1994 | Lu et al. |
| 5,418,918 A | 5/1995 | Vander Kamp et al. |
| 5,444,850 A | * 8/1995 | Chang ........................ 709/200 |
| 5,504,904 A | 4/1996 | Dayan et al. |
| 5,537,540 A | * 7/1996 | Miller et al. ................... 714/38 |
| 5,544,356 A | 8/1996 | Robinson et al. |
| 5,579,489 A | 11/1996 | Dornier et al. |
| 5,592,669 A | 1/1997 | Robinson et al. |
| 5,630,093 A | 5/1997 | Holzhammer et al. |
| 5,671,413 A | 9/1997 | Shipman et al. |
| 5,680,547 A | * 10/1997 | Chang ........................ 709/200 |
| 5,734,816 A | 3/1998 | Niijima et al. |
| 5,832,263 A | 11/1998 | Hansen et al. |
| 5,832,493 A | 11/1998 | Marshall et al. |
| 5,835,760 A | 11/1998 | Harmer |
| 5,854,905 A | 12/1998 | Garney |
| 5,896,534 A | 4/1999 | Pearce et al. |
| 5,991,778 A | 11/1999 | Starek et al. |
| 6,009,520 A | * 12/1999 | Gharda ........................ 713/1 |
| 6,178,503 B1 | * 1/2001 | Madden et al. ............... 713/2 |
| 6,272,629 B1 | * 8/2001 | Stewart ...................... 713/2 |
| 6,373,498 B1 | * 4/2002 | Abgrall ..................... 345/619 |
| 6,405,309 B1 | * 6/2002 | Chang et al. ................ 713/1 |

* cited by examiner

*Primary Examiner*—Jeffrey Gaffin
*Assistant Examiner*—Rijue Mai

(57) ABSTRACT

A special BIOS includes a program application manager (PAM) and a file system structure (FSS) that points to addresses on a mass storage device (MSD) for an application and at least one presentation playable by the application. The BIOS calls the PAM on startup, and the PAM checks for an application and presentation, and finding same loads the application and plays the presentation before loading the operating system (OS). In a preferred embodiment the FSS is programmable, and the system after OS boot is started checks MSD devices for new FSS parameters, and finding same loads the parameters to the programmable FSS of the BIOS. In some embodiments parameters may cause presentations and associated applications to be accessed and executed in a rotating or serial order.

12 Claims, 9 Drawing Sheets

VROM Application
User interface to manipulate each VROM area. SDK library
APIs included for third-party software to call the VROM BIOS.

VROM Driver
Operating system-dependent module.
Cooperates with VROM BIOS to access each VROM area.

VROM BIOS
VROM BIOS-layer functions

| Field | Offset | Length | Value |
|---|---|---|---|
| Signature | 00h | 8-bytes | VROMBIOS |
| Version | 08h | 1-byte | 10h |
| Length | 09h | 1 Word | 2Ah |
| Checksum | 0Bh | 1 byte | |
| Real Mode offset to entry point | 0Ch | 1-word | |
| Real Mode segment to entry point | 0Eh | 1-word | F000h |
| 32-bit protected mode code segment base address | 10h | 1-Dword | |
| Protected mode offset to entry point | 14h | 1-Dword | |
| 16-bit protected mode code segment base address | 18h | 1-Dword | |
| 32-bit code segment length | 1Ch | 1-Dword | 128K |
| 16-bit code segment length | 20h | 1-Dword | 64K |
| 32-bit VROM segment base address | 22h | 1-Dword | |
| 32-bit VROM data segment length | 26h | 1-Dword | 128K |

Installation Check Table

*Fig. 4*

| | |
|---|---|
| Signature | Represented as ASCII string "VROMBIOS" |
| Version | A BCD value i.e. (value of 10h = version 1.0. |
| Length | Total bytes of the entire installation structure starting from the signature field |
| Checksum | Adds up the bytes in the installation structure and verifies a valid structure |
| Real Mode Interface | Segment offset of the entry point |
| 32-bit Protected Mode Interface | Code segment base address |

Field Definition Table for Fig. 4

*Fig. 5*

Function-0 Get VROM Lists

Description: Returns VROM lists residing in flash VROM into List Buffer.

Function-1 Get VROM Size

Description: Returns VROM Size in bytes available to third party calling software

Function-2 Enable/Disable VROM List

Discription: Allows third party calling software to enable or disable The VROM list in the VROM Lists

Function-3 Read in VROM Data

Description: Read in the VROM Data of the specified VROM list from the VROM area

Function-4 Add/Delete VROM Data

Description: Allows third party calling software to add or delete VROM data

Table of third party software functions

*Fig. 6*

| Field | Offset | Length |
|---|---|---|
| Handle | 00h | 1 byte |
| Link to next list | 01h | 1 byte |
| VROM List State | 02h | 1 word |
| VROM Type | 04h | 1 word |
| Offset to VROM data | 06h | 1 dword |
| VROM data size | 08h | 1 dword |

Table of VROM List Stucture

| |
|---|
| Handle: VROM List Identifier |
| Link to next list: A pointer to a next VROM List |
| VROM list state: Represents the status of a VROM List |
| VROM type: Type of represented VROM data |
| Offset to VROM data: Phisical location offset |
| VROM data size: Indicates length of VROM data |

Definitions of fields in above table

*Fig. 7*

METHOD AND APPARATUS FOR EXECUTION OF AN APPLICATION DURING COMPUTER PRE-BOOT OPERATION

CROSS-REFERENCE TO RELATED DOCUMENTS

The present invention is a continuation in part (CIP) to a U.S. patent application filed on Dec. 10, 1997 bearing Ser. No. 08/988,603, now U.S. Pat. No. 6,009,520 and entitled Method and Apparatus for Standardizing Use of Non-Volatile Memory Within a Bios-Rom. The prior case is included herein by reference and inclusion.

FIELD OF THE INVENTION

The present invention is in the field of Basic Input Output System (BIOS) systems and has particular application to methods and apparatus including software for accessing a mass storage device to execute an application by utilizing unused flash or other non-volatile memory within a computer BIOS system chip.

BACKGROUND OF THE INVENTION

The present invention relates to system Basic Input Output Systems (BIOS). It is well-known in the computer arts that a BIOS program is provided, particularly for personal computers, to manage the intricate and critical operations of testing and initializing system hardware and, in general, preparing the computer and its connected peripherals for operation. Part of this procedure is widely known as a Power-On Self Test (POST) sequence. Beyond the POST procedure, the BIOS directs Boot operations, typically from a designated Boot device, such as a connected hard disk drive, and after Boot BIOS routines are accessed as needed to support operations such as communication between the connected digital devices that make up the computer system.

In early stages of PC development a relatively small, non-volatile, read-only memory (ROM) chip was more than adequate for system BIOS, and the relatively slow access to ROM was also adequate. As PC technology has developed to much faster CPUs and a wide range of ever more powerful and sophisticated peripheral devices, BIOS development has been forced to keep pace. BIOS routines have become much larger than early systems, and high operating speed has become necessary.

As a result of system development it is now common in state-of-the-art systems for BIOS to be compressed in a ROM chip, and for BIOS routines to be shadowed to system random-access memory (RAM) where the routines may be accessed and executed and much higher speeds than is possible running directly from ROM.

At the same time that BIOS routines have been enhanced and further developed for more sophisticated and powerful PCs, there has been parallel development in ROM chips. One such development is known as Flash ROM. Flash ROM is non-volatile IC memory that may be erased, either as a whole or in specific blocks, and overwritten with new memory values. BIOS is now provided in high-end PCs in these Flash ROM chips, providing new advantages, such as an ability to address system bugs in the field. BIOS can hence be "re-flashed" in the field to provide a new version, for example, such as by downloading a new version from the Internet, and re-flashing the existing BIOS ROM with the new version.

In a related development, flash ROM chips have been made larger and faster, and for various reasons related to economy of scale it has become uneconomic to make small flash ROM chips. At the time of the present patent application flash ROM chips are readily available in sizes of, for example, 1 mega-bit, (1 Mb), and 2 and 4 Mb and larger. These sizes relate to the more common byte-related memory capacity designation by a factor of eight. A four Mb Flash ROM the has a code capacity of 512 kilobyte (KB).

As a consequence of the availability of relatively inexpensive, large flash ROM chips, and the fact that compressed code is now common in BIOS, it is quite common at the time of the present application for system BIOS in Flash ROM to occupy considerably less than the total memory capacity of the chip. At the same time, because rapid development of new peripherals and expanded functionality of others, such as video displays, which are now high resolution and in color, there is a need for initialization of many devices at system start up, and initialization of all the devices cannot be included in the system BIOS all of the devices. Many such devices (VGA adapters, for example) therefore have BIOS functions provided by the manufacturers of the devices.

With the use of larger ROM chips, and particularly with Flash ROM, it is now possible for original-equipment manufacturers (OEMs), Value-Added Resellers (VARs) and the like to use extra memory capacity in a ROM chip storing BIOS functions for providing BIOS functions for peripherals, and also other routines, such as, for example, pre-boot security routines. With the present state of the art, however, it is necessary that a third party cooperate closely with a BIOS provider to add to and enhance the functionality of a BIOS chip. The partitioning, addressing, size, and other characteristics of the chip have to be known by the third party, and the structure and storage estate of the resident code has to be known as well.

A system known to the inventor allows a third party to flash in BIOS instructions for plug-n-play devices and certain utility applications so that they may be executed before or during the booting of the OS. Such a convention described as a virtual ROM (V-ROM) BIOS may be altered via a third party without requiring that the editing party have intimate knowledge of the architecture or data mapping of the chip. This system is described in the parent application referenced above.

It is desirable, in addition to flashing in certain added boot instruction to pre-boot operation, to be able to initiate and execute certain applications that would normally and conventionally depend upon a full loading of the OS before access is possible.

What is clearly needed is a BIOS system that has a program installed for finding, initializing, and executing certain applications from a hard drive or other mass storage device (MSD) before an operating system has loaded. Such a program would allow such as multimedia applications to play in a pre-planned manner providing advertisement or other viewer-targeted information before the operating system is loaded.

SUMMARY OF THE INVENTION

In a preferred embodiment of the present invention a basic input-output system (BIOS) is provided, comprising a BIOS code portion for initializing a computer system and loading an operating System (OS); and a preboot application manager (PAM) portion. The PAM portion is called and executed prior to loading the OS, and causes one or more applications and associated presentations residing on a mass storage device to be executed before OS loading is initiated. The presentations may be video clips comprising advertisements.

In another aspect of the invention a basic input-output system (BIOS) is provided, comprising a conventional BIOS code portion for initializing a computer system and loading an operating System (OS); and a preboot application manager (PAM) portion, including a programmable file system structure (FSS). The PAM portion is called and executed prior to loading the OS, checks for a valid mass storage device (MSD) listed in the FSS, analyzes a connected MSD, and upon finding a match launches necessary code to execute an associated application, executes the application, plays at least one presentation with the application, and then returns control to the BIOS code portion for booting the OS, and wherein the PAM portion upon failing to find a find a match, sets a flag indicating a match was not found, then initiates booting the OS.

In this embodiment, each time the OS is booted, the BIOS loads an FSS driver, checks for the flag being set, and if the flag is set analyzes a connected MSD, loads new parameters to the FSS for the next boot operation, and then continues to load the OS. If the BIOS determines the flag is not set, the BIOS deactivates the FSS driver and continues to load the OS. The parameters loaded to the FSS may cause the PAM to rotate among a plurality of presentations and associated applications with subsequent boot operations.

In another aspect of the invention a method for playing presentations on a computer before booting an operating system is provided, comprising steps of (a) including a preboot application manager (PAM) software in a BIOS directing computer initialization and operating system (OS) boot; (b) calling and executing the PAM upon startup prior to OS boot; (c) checking a file system structure (FSS) in the BIOS by the PAM for pointers to an application and a presentation on a mass storage device (MSD); (d) upon finding a MSD with an application and presentation according to the FSS, loading and executing the application and playing the presentation; and (e) proceeding to OS boot after playing the presentation. In this method the presentations may be video clips comprising advertisements.

In another aspect a method for playing presentations on a computer before booting an operating system is provided, comprising steps of (a) including a preboot application manager (PAM) software in a BIOS directing computer initialization and operating system (OS) boot; (b) calling and executing the PAM upon startup prior to OS boot; (c) checking a file system structure (FSS) in the BIOS by the PAM for pointers to an application and a presentation on a mass storage device (MSD); (d) upon finding a MSD with an application and presentation according to the FSS, loading and executing the application and playing the presentation; and (e) upon failing to find a MSD with an application and presentation according to the FSS, sets a flag indicating a match was not found, then initiates booting the OS.

In this method there may be a further step wherein, each time the OS is booted, the BIOS loads an FSS driver, checks for the flag being set, and if the flag is set analyzes a connected MSD, loads new parameters to the FSS for the next boot operation, and then continues to load the OS. If the BIOS determines the flag is not set, the BIOS deactivates the FSS driver and continues to load the OS. The parameters loaded to the FSS may cause the PAM to rotate among a plurality of associated presentations and associated applications with subsequent boot operations.

The invention in various embodiments for the first time provides a system wherein video clips such as advertisements may be played on a computer during initialization and before booting the operating system.

BRIEF DESCRIPTION OF THE DRAWING FIGURES

FIG. 4 is a table illustrating the structure of a third party software installation check for a VROM BIOS according to an embodiment of the present invention.

FIG. 5 is a field definition table for the fields represented in FIG. 4.

FIG. 6 is a table illustrating third party software functions according to an embodiment of the present invention.

FIG. 7 is a table illustrating VROM List structure and an accompanying definitions table according to an embodiment of the present invention.

DESCRIPTION OF THE PREFERRED EMBODIMENTS

Figure 1:
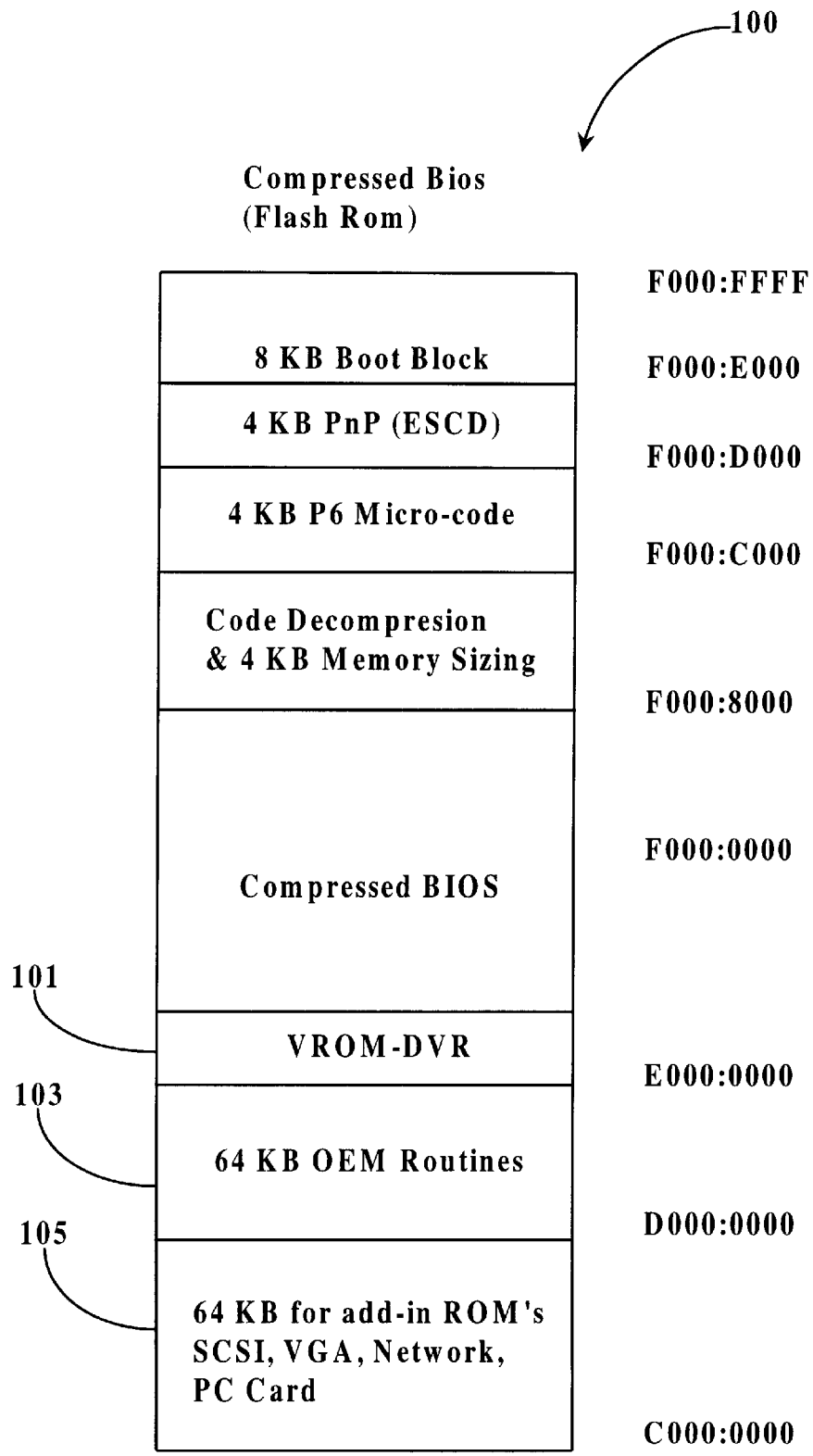
FIG. 1 is an enhanced BIOS memory map of a compressed BIOS in a 2 Mb Flask ROM according to an embodiment of the present invention.

In a preferred embodiment of the present invention a system BIOS is provided in flash ROM together with a unique driver associated with the BIOS as a mechanism for prioritizing, enabling, disabling, adding, and deleting plug-ins. The BIOS of the invention is not limited to Flash ROM, but could be applied to other types of reprogrammable non-volatile memory. Flash ROM is considered by the inventor to be a good choice for illustrating the several aspects of the invention, because some BIOS products in a preferred embodiment of the invention will be provided in Flash ROM.

In this specification the BIOS is named a Virtual ROM BIOS (VROM BIOS) and the unique driver which is part of the BIOS is termed the VROM-DVR. Given a flash-chip-resident VROM BIOS produced by a BIOS manufacturer according to an embodiment of the present invention, having an instance of the VROM-DVR, a cooperating third party, such as an OEM, may develop and install plug-ins in the Flash ROM adapted for a wide variety of purposes. In one aspect and embodiment of the invention plug-ins may be prepared and provided to OEMs by the BIOS manufacturer, and an OEM may then install the appropriate mix of plug-ins for a known or expected system architecture.

In another aspect of the invention third parties may be licensed or otherwise authorized to use a VROM development application provided by the BIOS manufacturer to develop and provide to the marketplace new VROM plug-ins. In some aspects end users may be able to also purchase and install plug-ins, such as by downloading from the Internet, for example.

In a preferred embodiment of the present invention the process of preparing and installing VROM-compatible plug-ins in a VROM BIOS works generally as follows: First a developer, using a VROM development application, prepares a plug-in incorporating the functional code to be installed. The functional code is accompanied by installation code compatible with the VROM-DVR of the VROM BIOS. In a system to which this plug-in is to be installed, the VROM BIOS is copied to RAM. This is a physical copy of the ROM chip arrangement of code, not the shadowing that takes place when a BIOS is initiated. The installation code accompanying the plug-in calls the VROM-DVR, which manages the addition of the function code of the new plug-in to the VROM BIOS copy in RAM.

In the installation process the VROM-DVR performs several operations, including checking for adequate space in the BIOS map for installation. In some embodiments, if the space is not available, the user may be prompted for approval to delete one or more resident modules to create room for the new plug-in. In others access may simply be denied, with explanation. If there is adequate space, the VROM-DVR adds the functional code of the new plug-in to the VROM BIOS RAM map, and then calls a reflash sequence to flash-erase the existing code in the BIOS chip, and to then copy the new RAM map to the chip.

It is not necessary that the developer or installer have any detailed knowledge of the chip itself, or of the mapping of VROM BIOS code on the chip. The VROM-DVR is specific to these facts and manages the installation according to necessity.

The VROM-BIOS is also adapted to manage deletion of plug-ins from a VROM BIOS chip in a fashion similar to that described above for code additions. A compatible program can call the VROM-DVR an initiate deletion of one or more modules, after which the chip may be reflashed to a new form. Other functions of the VROM-DVR are described below.

In many embodiments of the invention the VROM-DVR as a part of the VROM BIOS has other functionality, such as prioritizing and enabling plug-ins. The VROM-DVR may, for example, cooperate with POST code to scan for plug-ins, and enable and initiate plug-ins found.

FIG. 1 is a VROM BIOS 100 memory map illustrated in a compressed state in a 2 Mb (512 KB) Flash ROM chip according to an embodiment of the present invention, wherein VROM BIOS 100 has been enhanced with a unique VROM-DVR 101. The 2 Mb ROM chip is not limiting to the invention, which is applicable to other sizes, but 2 Mb is considered an adequate choice for illustrating aspects of the invention.

As an analogy, VROM-DVR 101 may be thought of in some respects as acting something like a mini-operating system that would read and write to a hard drive on a computer, except that in this case it is adapted to read from and write to the flash memory in BIOS 100. This unique and innovative approach allows a third party, such as an OEM, to add or remove components to and from BIOS 100 without intimate knowledge of the architecture and code content and residence of BIOS 100.

Figure 2:
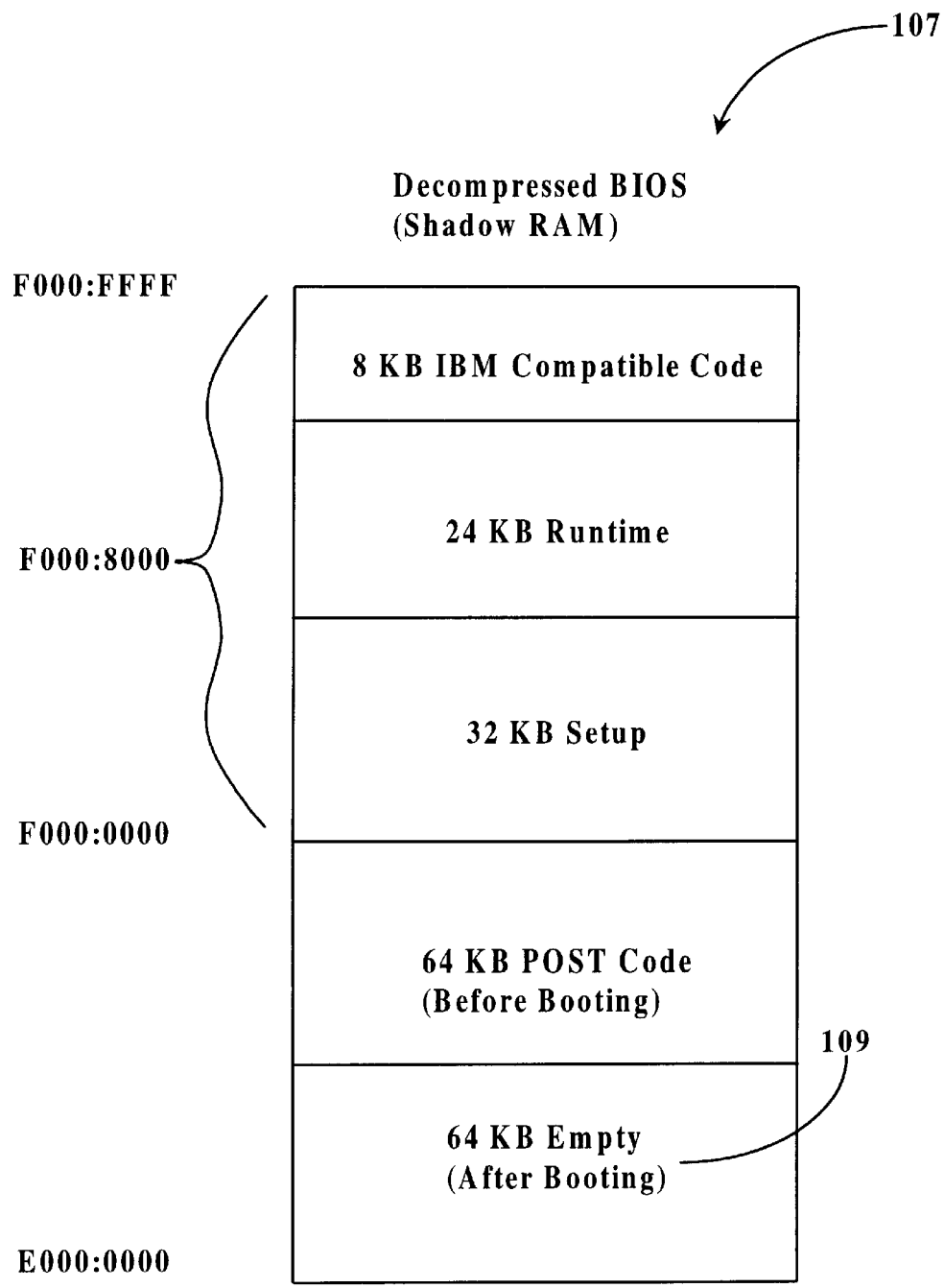
FIG. 2 illustrates the BIOS code map of FIG. 1 decompressed and shadowed to RAM in an embodiment of the present invention.

As described above, in a typical system ROM BIOS code is shadowed to RAM at startup. Since the code in the BIOS chip is compressed, decompression is typically accomplished as the code is passed to RAM. FIG. 2 is a RAM map of BIOS code after decompression and transfer to RAM. The amount of memory for BIOS and associated code in RAM is, of course, an issue, as memory is a precious resource in any system. The first set of operations to be performed by the BIOS code is the Power On Self Test (POST), and, after its use, this part of the code need not be retained in RAM, because it is not utilized during normal operations after POST, and will not be needed again until the system is powered down and restarted.

Referring to FIG. 1 and FIG. 2, memory addresses of data blocks in this embodiment are shown to the right of each block, and will be familiar to those skilled in the art. VROM-DVR 101 written into BIOS 100 during manufacturing provides a mechanism and method for prioritizing, enabling, disabling, adding, and deleting plug-ins without requiring intimate knowledge of chip architecture or code residence. The VROM-DVR is a code sequence that may be accessed by a CPU and executed, and is specific to a VROM-BIOS and its Flash ROM, having structure and/or access to stored data specific to the VROM BIOS version and the specific chip upon which the VROM BIOS is stored, in this example a 2 Mb Flash ROM.

Referring to FIG. 1, in addition to an 8 KB Boot Block, there is a 4 KB plug and play (PnP) utility, written in as extended system configuration data (ESCD), 4 KB of P6 Micro-code (known in the art), a 4 KB code decompression and memory sizing sector, and a compressed BIOS sector comprising the compressed BIOS function code. Section 103 is a 64 KB section reserved for plug-ins provided by an OEM, and section 105 is a 64 KB section reserved for add-in routines such as a Video Graphics Array (VGA) adapter, a small computer systems interface (SCSI) driver network and PC card plug-ins, and the like.

FIG. 2 is an exemplary BIOS memory map of the BIOS code of FIG. 1 shadowed to RAM according to an embodiment of the present invention. In this instance, runtime routines, IBM compatible code, and system set up routines are shown. Address location in RAM is illustrated to the left of FIG. 2 as is known in the art. 64 KB of power on self test (POST) code is shown in the shadowed RAM, and this same sector is shown again as empty after booting as element 109. This POST code is no longer needed after boot.

In the VROM BIOS the POST code is adapted to recognize added plug-ins and BIOS extensions, to relocate such plug-ins and extensions out of Flash ROM into shadow RAM, and to look for a signature and activate each such module by executing the module's INIT routine.

Table 111 in FIG. 2 represents locations in RAM where add-in device modules in section 105 of FIG. 1 are shadowed in this exemplary embodiment. The amount of add-in data or plug-n modules that may be employed is only limited by the amount of available unused flash-memory.

Figure 3:
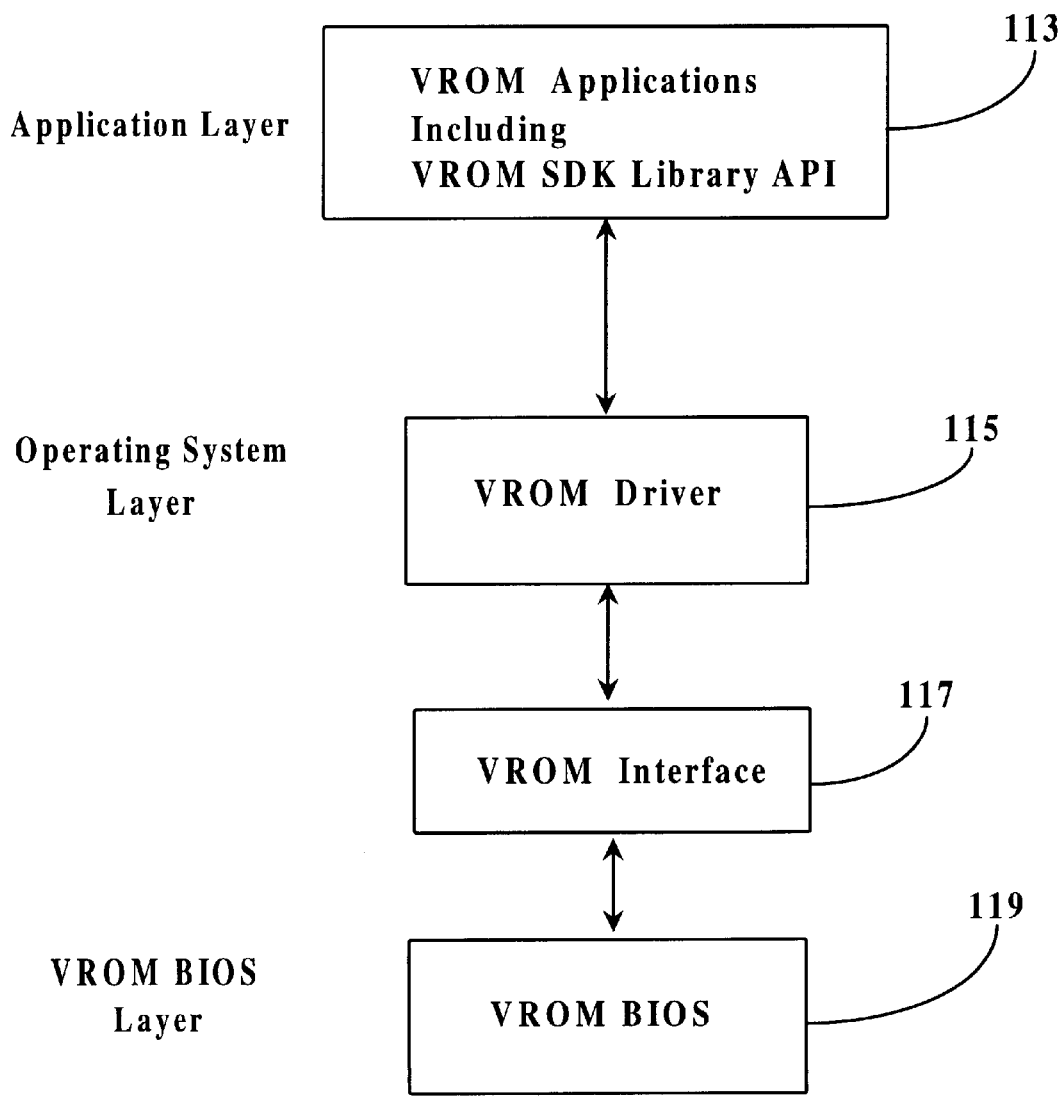
FIG. 3 is a block diagram illustrating the software architecture of a VROM system according to an embodiment of the present invention.

FIG. 3 is a block diagram illustrating software architecture of a VROM BIOS system according to an embodiment of the present invention. An application layer 113 represents a user interface adapted to enable a third party to prepare plug-ins to be added to a VROM BIOS having a VROM-DVR according to the invention, and includes in this example a software development kit (SDK) and application program interface (API) library. Examples of add-in programs may include but are not limited to virus protection programs, disk utility programs, network card scanning programs, and so on.

VROM driver 115 is the driver on the Flash ROM chip in this example (VROM-DVR) and is adapted to access each VROM area on BIOS 100 of FIG. 1. VROM-DVR 115 is specific to a Flash ROM (or other non-volatile storage device) upon which it resides, to the VROM-BIOS integrated in the ROM, and also to the Operating System (OS) of a computer upon to which the VROM-BIOS will be applicable. VROM BIOS 119 is the code set on BIOS 100 providing BIOS functionality.

FIG. 4 is a table illustrating the structure of an Installation Check that allows application software to determine if a system has in fact a VROM BIOS according to an embodiment of the present invention. The Installation Check includes a searching method for a signature of the ASCII string "VROMBIOS" in system memory starting from 0F0000h to 0FFFFFh at every 16-byte boundary. The software can then determine if the structure is valid by calculating the checksum. The method to perform the checksum operation is to add up the length bytes from the top of the structure into an 8-bit value. A sum of zero indicates a valid structure. The entry points in this structure are the software interface to the VROM BIOS functions.

FIG. 5 is a field definition table for the various fields listed in FIG. 4. Beginning at the top of FIG. 5, the field Signature is represented as an American Standard Code for Information Exchange (ASCII) string which is a common method for representing text with symbols. For example the character string "VROMBIOS" could be used. The version field is a BCD value that is represented as in the following example (value of 10h=version 1.0) etc. Length field is the total bytes of the whole installation structure starting from the signature. Checksum field is a simple error detection scheme that is known in the art. Checksum adds up the bytes in an installation structure and a receiving station then compares values to verify a valid structure. Real Mode Interface is the segment offset to the entry point. Real mode is the mode in which DOS executes it's programs. 32-bit protected mode interface is a code segment base address. With protected mode memory space is protected from overlapping into another memory space assigned to a different program. The Windows_operating system uses protected mode.

By incorporating both Real Mode and Protected Mode, add-in programs may be installed from DOS and from Windows_. It will be apparent to one with skill in the art that there are variations possible with respect to the tables presented in FIGS. 4 and 5 without departing from the spirit and scope of the present invention. For example, in one embodiment, installation could be performed using a different platform such as O/S 2 or UNIX. In a preferred embodiment a Windows_environment is utilized.

FIG. 6 is a table illustrating third party software function according to an embodiment of the present invention wherein listed functions are options to a third party such as a system integrator or a PC user. From top down, Function-0 Get VROM Lists returns VROM lists residing in flash VROM into a List Buffer where they can be analyzed. List Buffer as termed by the inventor must be large enough to hold all of the VROM lists. The next function is Function-1 Get VROM Size which returns the VROM size in bytes to the calling software. Function-2 Enable/Disable VROM List allows the caller to enable or disable the VROM List in the VROM lists. The VROM buffer as termed by the inventor must be large enough to store all of the VROM data. Function-3 Read in VROM Data allows a third party calling software to read in VROM data from VROM List area. Function-4 Add/Delete VROM Data allows third party calling software to add or delete VROM data.

It will be apparent to one with skill in the art that a third party calling software may be utilized by a software vendor that is licensed to provide the BIOS add-in program, a licensed system integrator, or by a user that has purchased a BIOS add-in program. Termed "VROM plug-ins" by the inventor, these add-in programs will typically be licensed products and can be either pre-boot functions or post-boot, BIOS-enabled functions.

FIG. 7 is a table illustrating a VROM List structure and an accompanying definition table according to an embodiment of the present invention. The inventor fully expects the list structure and accompanying definitions to be self-explanatory to those with skill in the art..

The VROM List tells the calling software application important information regarding where data is stored, how large each data block is, the type of data such as VGA, and so on. This data will change to reflect current status after an installation and/or deletion of a program. A mechanism (not shown) is also provided to offer a set of instructions in the event of a return error indicating a problem with the install. In one embodiment, a protection mechanism may restore previous settings by using a mirroring technique (known in the art) so that a backup or default installation may take priority.

It will be apparent to one with skill in the art that there are a variety of alterations that might be made in the embodiments of the invention described herein without departing from the spirit and scope of the present invention. Some of these variations have already been discussed, such as the use of other non-volatile storage devices other than Flash ROM, and differing sized of storage devices that may be used other than the 2 Mb ROM described in embodiments herein. There are many other such variations. It is well-known, for example, that programmers have individualistic ways to structure code, and many variable code structures may accomplish similar ends. Similarly there are many sorts of plug-ins that may be accomplished to a VROM BIOS according to an embodiment of the present invention. Some may accomplish pre-boot functions, and others may accomplish post-boot BIOS-enabled functions. Among the many possibilities are disk utility programs, virus protection programs, PC card scanning programs, specific device BIOS code, and the like.

Pre-boot Application Manager (PAM)

In one aspect of the present invention a BIOS extension module is provided and adapted to locate, initialize, and execute certain applications, including multimedia applications in a preferred embodiment, from stored location on a hard drive or other connected mass-storage-device (MSD) before normal booting of the operating system. The extension module, termed a pre-boot application-manager (PAM) by the inventors, may be provided as part of a normal BIOS, or as part of a V-ROM BIOS described in the disclosure referenced above as a parent application and incorporated herein by reference.

In a preferred embodiment, a V-ROM BIOS as known to the inventors is used because of versatile flash-in capabilities inherent to the device. A PAM in embodiments of the present invention is a software module installed or flashed in as an extension to a system BIOS such as a V-ROM BIOS. A PAM module in this embodiment comprises separate parts that take up residence in specific areas of V-ROM-BIOS. For example, a NVM part of PAM is resident in NVM (non-volatile-memory) and is loaded and executed by V-ROM. A post-boot part of PAM is implemented for accessing or setting up new MSDs, finds required driver information (location and type), and binds that information into a third part or file-system-structure (FSS) module, which then becomes a part of NVM resident code. One with skill in the art will appreciate that the functional implementation of a PAM into a BIOS chip, whether flashed in, or pre-installed, will follow BIOS convention during execution such as compression, shadowing, and addressing techniques that have already been described with reference to FIGS. 1–7 above. Therefore, the inventors deem that the process steps described below will be sufficient for explaining the present invention in an enabling manner.

Figure 8:
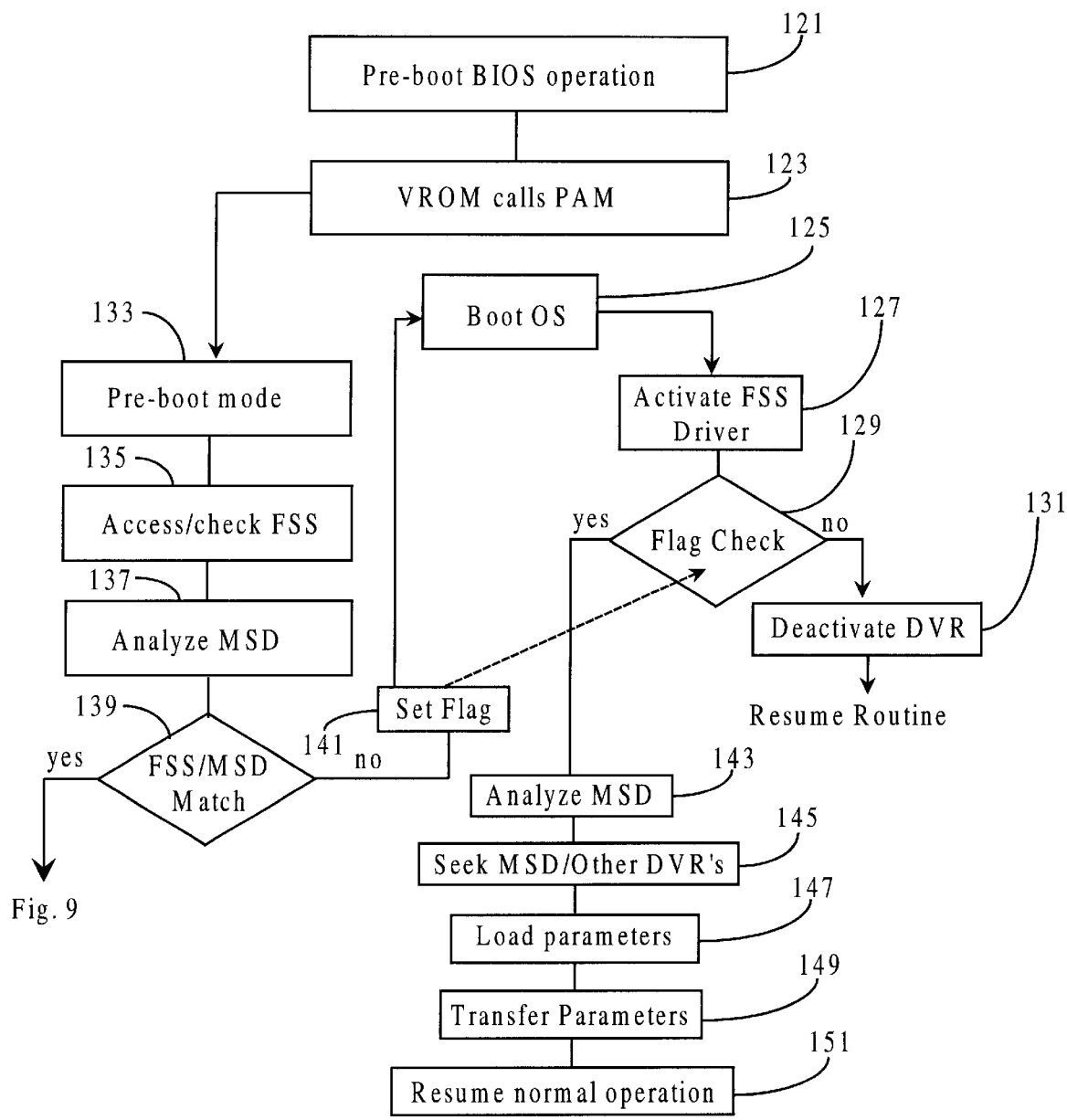
FIG. 8 is a process flow chart illustrating process steps according to an embodiment of the present invention.

FIG. 8 is a process flow chart illustrating logical process steps for VROM execution of a PAM according to an embodiment of the present invention. In this exemplary embodiment, the method and apparatus of the present invention is provided and integrated with V-ROM functions as described above. This process assumes that a flashable V-ROM chip is installed and operable according to previous embodiments as taught in disclosure above.

In step 121, pre-boot BIOS operation begins. In step 123, V-ROM calls and executes a PAM module. Step 133 represents a pre-boot mode during which time PAM begins operation. At step 135, PAM accesses and scans it's FSS module for valid MSD information such as type, size, OS parameters, and so on. If MSD information pointers are available, indicating that a device is recognized, then the designated MSD is analyzed in step 137. This step confirms parameters for a match such as type (SCSI IDE), size, (capacity, available memory), format (number of boot partitions, type of OS), and so on. At step 139, PAM determines if a match has been made. If yes, the process resumes with steps illustrated in FIG. 9, step 140. However, if there is no match, then it is assumed that the system has been modified (given different instruction) or the MSD is a new device and has to be re-set.

Assuming for purpose of description that the system is being booted for the first time after flash-in, or that a new default MSD is being added, there would be no match in step 139. At this juncture, PAM sets a flag (step 141) which may be a simple binary code so that new parameters associated with the new MSD may be loaded into BIOS for the next boot operation. Such parameters may include any required information including but not limited to driver location and identification for accessing and launching any pre-boot applications such as videos, static ads, audio ads, or other pre-boot informative displays. The process then proceeds as illustrated via directional arrow back to step 125 to boot the OS.

After OS booting initiated in step 125, an FSS driver having capability of accessing and analyzing a connected MSD is activated in step 127, along with other system drivers. At step 129, the driver checks for the pre-set flag set in step 141. If the flag is found, which means that there is currently no valid MSD installed, the process proceeds to step 143 where the new MSD is analyzed. At step 145, the parameters associated with MSD drivers and other drivers that are generic to pre-boot applications intended to be executed during pre-boot operations, are located on the MSD. At step 147, such parameters are loaded and prepared for transfer into the FSS module of step 135. After completion of transfer of parameters from the MSD into the FSS module at step 149, normal system operation, including complete booting of the OS resumes in step 151.

The next time that the system is powered on, the new changes are recognized during pre-boot analysis and any loaded ads including multimedia ads will be accessed and displayed automatically, after which the OS will be booted. If however, there is no flag set in step 141, then there will be no flag found in step 129. This assumes that required information was already accessed, loaded and matched in step 139 during a previous boot event. If so, then the process proceeds to FIG. 9 as previously described.

Figure 9:
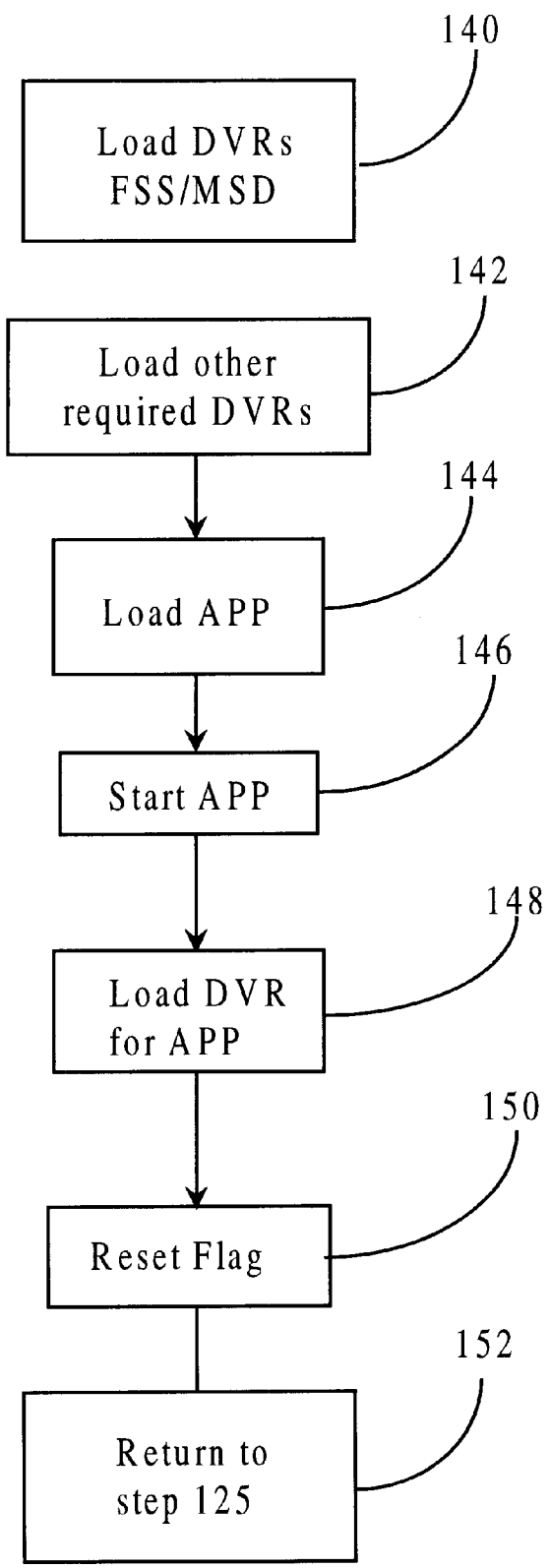
FIG. 9 is a process flow chart depended from the flow chart of FIG. 8 illustrating an application loading sequence according to an embodiment of the present invention.

FIG. 9 is a process flow chart depended from the flow chart of FIG. 8 illustrating an application loading sequence according to an embodiment of the present invention. FIG. 9 illustrates the loading sequence for accessing an MSD and displaying such as advertisements according to matched information contained in the FSS module of step 139 (FIG. 8). In step 140, the FSS module accesses and loads MSD drivers into NVM. In step 142 any application drivers are similarly loaded. At step 144, any targeted application programs (ads) are loaded from the MSD. The loaded application(s) is then executed in step 146. The application's driver is then executed in step 148 in a manner consistent with normal execution under a fully loaded OS. The application(s) is displayed during the time from power-on to OS-load. (pre-boot and possibly during-boot). A new flag is then set at step 150 which will point to any new additions or changes to the pre-boot advertisements for the next boot-up.

The process flow sequence as taught above in FIGS. 8 and 9 is meant to be exemplary of one such process that could be implemented in practice of the present invention. There are many variations that may be included without departing from the spirit and scope of the present invention. In one embodiment for example, an ad schedule may be downloaded from a switched packet network to an MSD. The ad schedule may include several individual ads, such as perhaps MPEG video clips, wherein one clip will be played per pre-boot event in serial order (rotated). An FSS driver capable of disseminating the ad schedule, and identifying the appropriate ad and application driver will set a new flag for the next ad after playing the previous ad. In this way, the next time the system is powered on, the new ad will be loaded and played.

In another embodiment of the present invention, an application is provided as part of PAM software that resides on a connected MSD and can communicate with counterpart software in system BIOS. In this embodiment, any new ads of any media type may be selected by a user and flashed into BIOS at any time during normal operation. Similarly, such ads and driver information may be flashed into BIOS by a third party utilizing a connected network server adapted for the purpose. After the system is powered on, the new pointers are registered and retained into system BIOS (FSS module). These pointers may indicate, in some embodiments, a new or alternately selected MSD device on which the ads reside.

In still another embodiment, an FSS module may be segmented to contain separate blocks of information pertaining to more than one MSD having separate ads resident thereon. This variation may reflect a number of individual video-display-units (VDU's) networked together and having minimal and individual MSD capability. A main booting station and MSD connected to the network of VDU's may provide BIOS initialization for each connected unit. In this embodiment, pre-boot ads or instruction may be personalized to individuals assigned such VDU's. There are many variant possibilities for presenting pre-boot applications. Therefore, the method and apparatus of the present invention should be afforded the broadest scope. The spirit and scope of the present invention is limited only by the claims that follow.

What is claimed is:

1. A basic input-output system (BIOS), comprising:
   a BIOS code portion for initializing a computer system and loading an operating system (OS); and;
   a preboot application manager (PAM) portion;
   wherein the PAM portion is called and executed prior to loading the OS, and causes one or more applications and associated presentations residing on a mass storage device to be executed under the control of the computer system before OS loading is initiated.

2. The BIOS of claim 1 wherein the one or more presentations include video clips comprising advertisements.

3. A basic input-output system, comprising:
a conventional BIOS code portion for initializing a computer system and loading an operating system (OS); and
a preboot application manager (PAM) portion, including a programmable file system structure (FSS);
wherein the PAM portion is called and executed prior to loading the OS, checks for a valid mass storage device (MSD) listed in the FSS, analyzes the valid MSD, and in response to finding the valid MSD, launches necessary code to execute an associated application, executes the application, plays at least one presentation with the application, and then returns control to the BIOS code portion for booting the OS, and wherein the PAM portion upon failing to find the valid MSD, sets a flag indicting the valid MSD was not found, then initiates booting the OS.

4. The BIOS of claim 3 wherein, each time the OS is booted, the BIOS loads an FSS driver, checks for the flag being set, and if the flag is set analyzes a connected MSD, loads new parameters to the FSS for the next boot operation, and then continues to load the OS.

5. The BIOS of claim 3 wherein, if the BIOS determines the flag is not set, the BIOS deactivates the FSS driver and continues to load the OS.

6. The BIOS of claim 4 wherein the parameters loaded to the FSS cause the PAM to rotate among a plurality of presentations and associated applications with subsequent boot operations.

7. A method for playing presentations on a computer before booting an operating system, comprising:
including a preboot application manager (PAM) software in a BIOS directing computer initialization and operating system (OS) boot;
calling and executing the PAM upon startup prior to OS boot;
checking a file system structure (FSS) in the BIOS by the PAM for pointers to an application and a presentation on a mass storage device (MSD);
in response to finding a MSD with the application and presentation according to the FSS, loading and executing the application and playing the presentation; and
proceeding to OS boot after playing the presentation.

8. The method of claim 7 wherein the presentations are video clips comprising advertisements.

9. A method for playing presentations on a computer before booting an operating system, comprising:
including a preboot application manager (PAM) software in a BIOS directing computer initialization and operating system (OS) boot;
calling and executing the PAM upon startup prior to OS boot;
checking a file system structure (FSS) in the BIOS by the PAM for pointers to an application and a presentation on a mass storage device (MSD);
in response to finding the MSD with the application and presentation according to the FSS, loading and executing the application and playing the presentation; and
upon failing to find the MSD with the application and presentation according to the FSS, setting a flag indicating a match was not found, then initiating booting the OS.

10. The method of claim 9 further comprising a step wherein, each time the OS is booted, the BIOS loads an FSS driver, checks for the flag being set, and if the flag is set analyzes a connected MSD, loads new parameters to the FSS for the next boot operation, and then continues to load the OS.

11. The method of claim 10 wherein, if the BIOS determines the flag is not set, the BIOS deactivates the FSS driver and continues to load the OS.

12. The method of claim 10 wherein the parameters loaded to the FSS cause the PAM to rotate among a plurality of associated presentations and associated applications with subsequent boot operations.

* * * * *